United States Patent
Nishiguchi

(10) Patent No.: US 10,033,957 B2
(45) Date of Patent: Jul. 24, 2018

(54) LIQUID CRYSTAL DISPLAY DEVICE

(71) Applicant: Sharp Kabushiki Kaisha, Sakai, Osaka (JP)

(72) Inventor: Takenobu Nishiguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/318,456

(22) PCT Filed: Jun. 4, 2015

(86) PCT No.: PCT/JP2015/066144
§ 371 (c)(1),
(2) Date: Dec. 13, 2016

(87) PCT Pub. No.: WO2016/002424
PCT Pub. Date: Jan. 7, 2016

(65) Prior Publication Data
US 2017/0150085 A1    May 25, 2017

(30) Foreign Application Priority Data
Apr. 7, 2014   (JP) .................................. 2014-139022

(51) Int. Cl.
*H04N 5/445* (2011.01)
*H04N 5/57* (2006.01)
(Continued)

(52) U.S. Cl.
CPC ....... *H04N 5/44504* (2013.01); *G09G 3/2003* (2013.01); *G09G 3/3413* (2013.01);
(Continued)

(58) Field of Classification Search
CPC combination set(s) only.
See application file for complete search history.

(56) References Cited

U.S. PATENT DOCUMENTS

| 8,941,127 B2 * | 1/2015 | Koyama | G02F 1/13624 |
| | | | 257/88 |
| 2002/0036604 A1 * | 3/2002 | Yamazaki | G09G 3/3266 |
| | | | 345/76 |

(Continued)

FOREIGN PATENT DOCUMENTS

| JP | H08-317350 A | 11/1996 |
| JP | H08-331527 A | 12/1996 |

(Continued)

OTHER PUBLICATIONS

International Search Report PCT/ISA/210 for International Application No. PCT/JP2015/066144 dated Sep. 1, 2015.

(Continued)

*Primary Examiner* — Andrew Sasinowski
(74) *Attorney, Agent, or Firm* — ScienBiziP, P.C.

(57) ABSTRACT

Conventionally, in a transparent display area, a gradation value of each color component is assigned to transparent gradation. Hence, when video is displayed in a video display area, each color component can only be represented in gradations with a gradation value of 0 to 1022, and it becomes necessary to assign pixel values to the transparent gradation. Accordingly, a color represented by those pixel values cannot be displayed. In view of this, by adding transparent area information to a vertical blanking period of a video signal, the pixel values can also be used to display video. By this, each of the color components can be represented in gradations with a gradation value of 0 to 1023, and thus, video can be displayed in full-range color even when a transparent display area is provided.

9 Claims, 14 Drawing Sheets

(51) Int. Cl.
*G09G 3/34* (2006.01)
*G09G 3/20* (2006.01)
*G09G 3/36* (2006.01)

(52) U.S. Cl.
CPC ............ G09G 3/3607 (2013.01); H04N 5/57 (2013.01); *G09G 2310/0235* (2013.01); *G09G 2310/061* (2013.01); *G09G 2320/0242* (2013.01)

(56) References Cited

U.S. PATENT DOCUMENTS

| | | | | |
|---|---|---|---|---|
| 2005/0225708 | A1* | 10/2005 | Oke | G02F 1/134363 349/139 |
| 2009/0046993 | A1 | 2/2009 | Nishio | |
| 2009/0128533 | A1* | 5/2009 | Tsubata | G02F 1/13624 345/209 |
| 2010/0033627 | A1* | 2/2010 | Hayashi | G09G 5/005 348/500 |
| 2011/0248970 | A1* | 10/2011 | Koyama | G02F 1/13452 345/204 |
| 2012/0002133 | A1* | 1/2012 | Yamazaki | G09G 3/342 349/61 |
| 2015/0302805 | A1 | 10/2015 | Miyata | |

FOREIGN PATENT DOCUMENTS

| | | |
|---|---|---|
| JP | 2005-033435 A | 2/2005 |
| WO | 2007/102413 A1 | 9/2007 |
| WO | 2008/111257 A1 | 9/2008 |
| WO | 2014/097976 A1 | 6/2014 |

OTHER PUBLICATIONS

Written Opinion of the International Searching Authority PCT/ISA/237 for International Application No. PCT/JP2015/066144 dated Sep. 1, 2015.

* cited by examiner (A)

(B)

LIQUID CRYSTAL DISPLAY DEVICE

TECHNICAL FIELD

The present invention relates to a liquid crystal display device, and more particularly to a liquid crystal display device that performs color display using a field sequential system or a color filter system.

BACKGROUND ART

Most of liquid crystal display devices that perform color display include color filters that allow red (R), green (G), and blue (B) lights to be transmitted therethrough for respective three subpixels into which one pixel is divided. However, since about two-thirds of backlight light that is irradiated onto a liquid crystal display panel is absorbed by the color filters, a liquid crystal display device of a color filter system has a problem of low light use efficiency. Hence, attention is focused on a liquid crystal display device of a field sequential system that performs color display without using color filters.

In the field sequential system, one frame period which is a display period of one screen is divided into three subframe periods. During a first subframe period, a red screen is displayed by allowing red light sources to emit light while a red component of a video signal is inputted. During a second subframe period, a green screen is displayed by allowing green light sources to emit light while a green component of the video signal is inputted. During a third subframe period, a blue screen is displayed by allowing blue light sources to emit light while a blue component of the video signal is inputted. Since the liquid crystal display device of the field sequential system displays red, green, and blue screens in turn in such a manner, a viewer can visually recognize color video by an afterimage effect. As such, since the liquid crystal display device of the field sequential system does not require color filters, the light use efficiency improves by about three times compared to the liquid crystal display device of the color filter system.

Patent Document 1 describes that by receiving a video signal added with content identification information during a blanking period, optimum processing according to the type of content is performed on the video signal based on the content identification information. In addition, Patent Document 2 describes that a system that handles two-system video signals: a first video signal for displaying OSD (On Screen Display) video and a second video signal for displaying different video than the OSD video, transmits OSD information added to a blanking period of the second video signal.

PRIOR ART DOCUMENTS

Patent Documents

[Patent Document 1] International Publication Pamphlet No. WO 2008/111257
[Patent Document 2] Japanese Patent Application Laid-Open No. 2005-33435

SUMMARY OF THE INVENTION

Problems to be Solved by the Invention

FIG. 14 is a diagram showing that a conventional liquid crystal display device of a field sequential system treats a specific gradation value as transparent gradation. As shown in FIG. 14, for example, when each of red, green, and blue color components is 10 bits, if only a normal image is displayed, then each color component can be displayed in 1024 gradations with a gradation value of 0 to 1023. However, when see-through (transparent) display is performed, a specific gradation value (e.g., a gradation value of 1023) of each color component is assigned to transparent gradation. As such, in the liquid crystal display device, if a specific gradation value is assigned to the transparent gradation, then the specific gradation value cannot be used to display video. Due to this, there is a problem that video cannot be displayed using all displayable colors.

In addition, according to an invention described in Patent Document 1, since only information for identifying the type of content is inserted in a blanking period of a video signal, when a transparent area is set on a display panel, a specific gradation value of the video signal needs to be assigned to transparent gradation. Likewise, in an invention described in Patent Document 2, too, although it is described that OSD information is transmitted during a blanking period of a second video signal, it is not described that transparent area information is also transmitted during the blanking period. Hence, to add the transparent area information, a specific gradation value of the second video signal needs to be assigned to transparent gradation. As such, in either case, to set a transparent area on a display unit, a specific gradation value of a video signal needs to be assigned to transparent gradation. In this case, since the specific gradation value assigned to the transparent gradation cannot be used as a video signal, video cannot be represented using all displayable colors.

An object of the present invention is therefore to provide a liquid crystal display device capable of displaying video using all displayable colors.

Means for Solving the Problems

A first aspect of the present invention is directed to a liquid crystal display device that displays video represented by a video signal inputted from a signal source, the liquid crystal display device including:

a display unit including a plurality of pixel formation portions;

a driving unit configured to display the video on the display unit, based on the video signal; and a signal processing unit configured to control display states of the pixel formation portions, based on inputted display area information, the display area information being added to the video signal, wherein the display area information is provided added to the video signal, and the driving unit controls a display state of a pixel formation portion that is identified by the display area information, and displays the video on a pixel formation portion that is not identified by the display area information.

According to a second aspect of the present invention, in the first aspect of the present invention, wherein, in order to irradiate the display unit with light, the liquid crystal display device divides one frame period into a plurality of subframe periods and further comprises a light source unit including: light sources of a plurality of colors that are configured to emit lights of specified colors during the respective subframe periods; and a backlight drive circuit configured to drive the light sources, by which screens of different colors are displayed during the respective subframe periods, the display area information is transparent area information including transparent display information indicating, for each of the pixel formation portions, whether the pixel formation portion is to perform transparent display, the signal processing unit includes: a transparent gradation control circuit configured to read the transparent display information from the display area information added to the video signal; a separating circuit connected to the transparent gradation control circuit and configured to separate the video signal for the one frame period by color; and a frequency conversion circuit configured to read, from the separating circuit, the video signals separated for the respective colors, performs frequency conversion on the video signals, and provides to the driving unit the frequency-converted video signals together with the transparent display information read by the transparent gradation control circuit, the video signals displaying a screen of one color or screens of two or more colors, and the driving unit performs transparent display on a pixel formation portion that is identified by the transparent display information, and displays the video on a pixel formation portion that is not identified by the transparent display information.

According to a third aspect of the present invention, in the second aspect of the present invention, wherein the transparent area information is added to at least any one of a vertical blanking period and a horizontal blanking period of the video signal and an added transparent area of the video signal.

According to a fourth aspect of the present invention, in the second aspect of the present invention, wherein the transparent area information is added to at least either one of a vertical blanking period and a horizontal blanking period of the video signal and to an added transparent area of the video signal.

According to a fifth aspect of the present invention, in the third aspect of the present invention, wherein, the transparent area information further includes transparency information for setting a transparency of a pixel formation portion that performs transparent display, by controlling luminances of the light sources, and the light sources are composed of light emitting diodes disposed for one or two or more pixel formation portions, and the backlight drive circuit controls the luminances by adjusting drive current values of the light emitting diodes, based on the transparency information.

According to a sixth aspect of the present invention, in the fifth aspect of the present invention, wherein the transparent area information is added to a back porch period or a front porch period of the vertical blanking period or the horizontal blanking period.

According to a seventh aspect of the present invention, in the second aspect of the present invention, wherein the transparent display information and the transparency information are added consecutively to any one of the vertical blanking period, the horizontal blanking period, and the added transparent area of the video signal.

According to an eighth aspect of the present invention, in the second aspect of the present invention, wherein the transparent display information is added to any one of the vertical blanking period, the horizontal blanking period, and the added transparent area of the video signal, and the transparency information is added to either one of remaining ones.

According to a ninth aspect of the present invention, in the fifth aspect of the present invention, wherein at least either one of the transparent display information and the transparency information is added, every horizontal scanning period, to the horizontal blanking period, starting from when a vertical synchronizing signal falls or rises.

According to a tenth aspect of the present invention, in the fifth aspect of the present invention, wherein at least either one of the transparent display information and the transparency information is added to the horizontal blanking period adjacent to an area where the video signal is displayed.

According to an eleventh aspect of the present invention, in the first aspect of the present invention, wherein, the display area information is hidden-area information including fill information indicating whether the pixel formation portions are filled with a predetermined color, the signal processing unit includes a hidden-area control circuit configured to read the fill information added to either one of a vertical blanking period and a horizontal blanking period of the video signal, and the driving unit fills a pixel formation portion that is identified by the fill information with the predetermined color, and displays the video on a pixel formation portion that is not identified by the fill information.

According to a twelfth aspect of the present invention, in the eleventh aspect of the present invention, wherein, the hidden-area information further includes character information for displaying a character, the fill information and the character information are collectively added to either one of the vertical blanking period and the horizontal blanking period, or separately added to the vertical blanking period and the horizontal blanking period, and the driving unit displays, based on the character information, a character on the pixel formation portion filled based on the fill information.

Effects of the Invention

According to the first aspect, by providing display area information added to a video signal, pixel formation portions that are identified by the display area information go into a predetermined display state, the display area information indicating the display states of the pixel formation portions. By this, it becomes unnecessary to assign one of the color depths of color components included in the video signal to display area information. Accordingly, when the pixel formation portions are brought into their display states which are determined by the display area information, video displayed on the pixel formation portions can be displayed using all colors.

According to the second aspect, in a liquid crystal display device of a field sequential system, transparent display information is provided added to a video signal, the transparent display information indicating, for each pixel formation portion, whether the pixel formation portion is to perform transparent display. By this, pixel formation portions that are identified by the transparent display information perform transparent display. Hence, it becomes unnecessary to assign one of the color depths of color components included in the video signal to transparent display information. Accordingly, when pixel formation portions perform transparent display, video displayed on pixel formation portions that do not perform transparent display can be displayed using all colors.

According to the third aspect, since transparent display information is added to at least either one of a vertical blanking period and a horizontal blanking period of a video signal and an added transparent area of a video signal, it becomes unnecessary to assign one of the color depths of color components included in the video signal to transparent display information. By this, when pixel formation portions perform transparent display, video displayed on pixel formation portions that do not perform transparent display can be displayed using all colors.

According to the fourth aspect, since transparent display information is added to either one of a vertical blanking period and a horizontal blanking period of a video signal and to an added transparent area of a video signal, it becomes unnecessary to assign one of the color depths of color components included in the video signal to transparent display information. By this, when pixel formation portions perform transparent display, video displayed on pixel formation portions that do not perform transparent display can be displayed using all colors.

According to the fifth aspect, transparent area information also includes transparency information for setting the transparencies of the pixel formation portions by controlling the luminances of light sources. By adjusting, based on the transparency information, the drive current values of light emitting diodes which are disposed for the pixel formation portions, the luminances of the light emitting diodes are controlled, enabling to set the transparencies of pixel formation portions that perform transparent display.

According to the sixth aspect, transparent area information is added to a back porch period or a front porch period of a vertical blanking period or a horizontal blanking period.

According to the seventh aspect, transparent display information and transparency information are added consecutively to any one of a vertical blanking period, a horizontal blanking period, and an added transparent area of a video signal.

According to the eighth aspect, transparent display information is added to any one of a vertical blanking period, a horizontal blanking period, and an added transparent area of a video signal, and transparency information is added to either one of the remaining ones. For example, when transparent display information is added to the vertical blanking period, transparency information is added to either one of the horizontal blanking period and the added transparent area of the video signal.

According to the ninth aspect, when at least either one of transparent display information and transparency information which are included in transparent area information is provided to a horizontal blanking period, at least either one of the transparent display information and the transparency information is added every horizontal scanning period from when a vertical synchronizing signal falls or rises.

According to the tenth aspect, at least either one of transparent display information and transparency information which are included in transparent area information is provided to a horizontal blanking period adjacent to an area where a video signal is displayed.

According to the eleventh aspect, fill information indicating, for each pixel formation portion, whether the pixel formation portion is to be filled is provided added to at least either one of a vertical blanking period and a horizontal blanking period of a video signal. By this, pixel formation portions that are identified by the fill information are displayed in a state of being filled with a predetermined color.

Hence, since it becomes unnecessary to assign one of the color depths of color components included in the video signal to fill information, when pixel formation portions are filled, video displayed on pixel formation portions that are not filled can be displayed using all colors.

According to the twelfth aspect, hidden-area information further includes character information for displaying a character on a filled pixel formation portion. The character information and fill information are collectively added to either one of a vertical blanking period and a horizontal blanking period, or separately added to the vertical blanking period and the horizontal blanking period. Since the character information is provided to a filled pixel formation portion, a character is displayed on the filled pixel formation portion.

MODES FOR CARRYING OUT THE INVENTION

1. First Embodiment

<1.1 Configuration of a Liquid Crystal Display Device>

Figure 1:
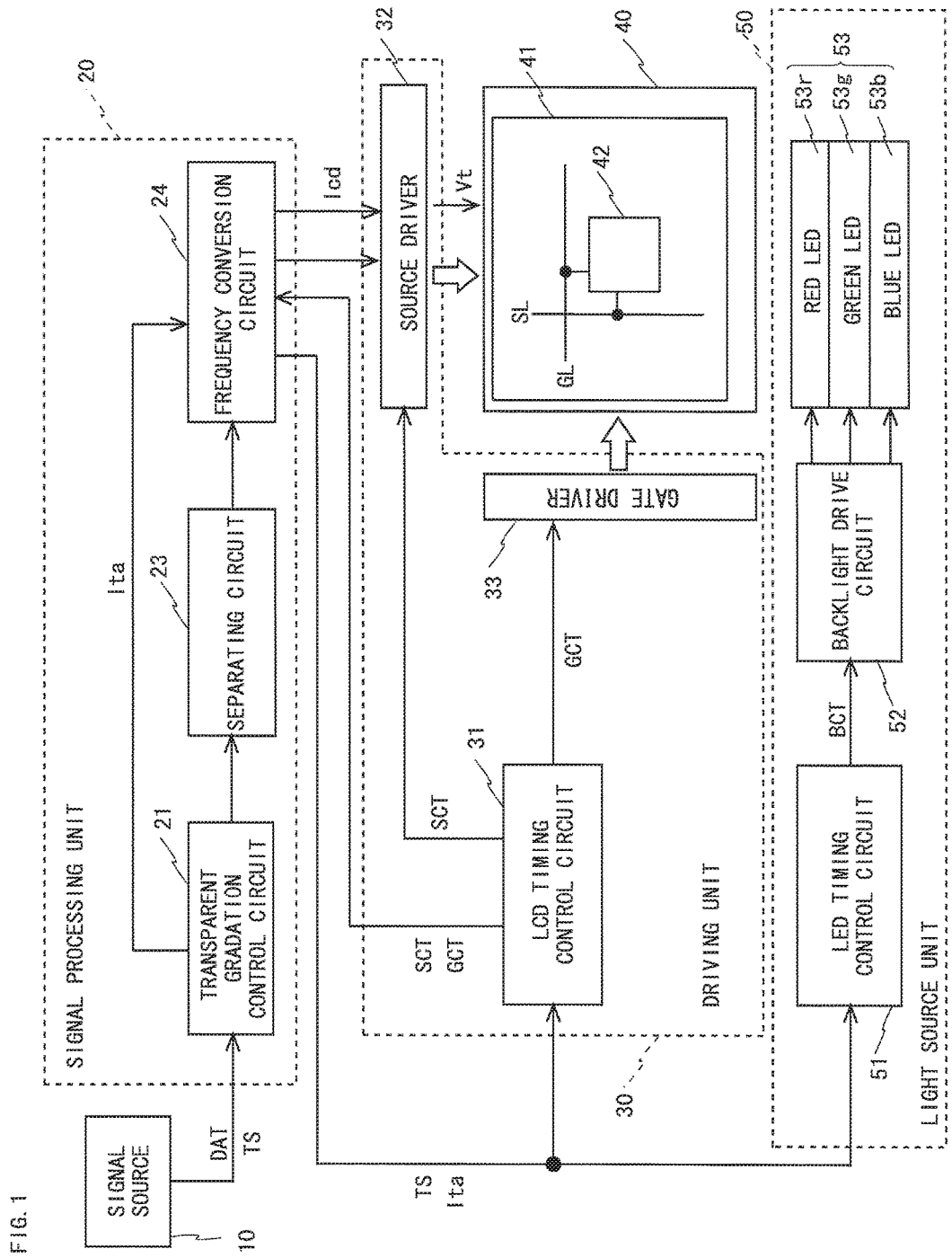
FIG. 1 is a block diagram showing a configuration of a liquid crystal display device of a field sequential system according to a first embodiment of the present invention.

FIG. 1 is a block diagram showing a configuration of a liquid crystal display device of a field sequential system according to a first embodiment of the present invention. The liquid crystal display device according to the present embodiment is a display device that performs color display using a field sequential system where one frame period is time-divided into three subframe periods. As shown in FIG. 1, the liquid crystal display device includes a signal source 10, a signal processing unit 20, a driving unit 30, a liquid crystal panel 40, and a light source unit 50.

The signal processing unit 20 includes a transparent gradation control circuit 21, a separating circuit 23, and a frequency conversion circuit 24. The driving unit 30 includes an LCD timing control circuit 31, a source driver 32, and a gate driver 33. The light source unit 50 includes an LED timing control circuit 51, a backlight drive circuit 52, and red, green, and blue LEDs (Light Emitting Diodes) 53r, 53g, and 53b that emit red, green, and blue lights, respectively. When the LEDs 53r, 53g, and 53b are not distinguished from each other, the LEDs 53r, 53g, and 53b may be referred to as "LEDs 53".

In the following description, for example, one frame period is $1/60$ seconds and each of the subframe periods during which red, green, and blue videos are displayed is $1/180$ seconds. In addition, it is assumed that each of the color depths of a red component (R component), a green component (G component), and a blue component (B component) which are included in a video signal DAT to be inputted to the signal processing unit 20 from the signal source 10 is 10 bits. In this case, the liquid crystal display device can represent each of the red, green, and blue colors in 1024 gradations and thus can display about 1.07 billion colors (to be exact, 1024×1024×1024 colors) on the liquid crystal panel 40. Note that the color depth of each color component is not limited to 10 bits and may be, for example, 8 bits, 12 bits, 14 bits, etc. Note that an R component, a G component, and a B component may be collectively referred to as "color components".

The signal source 10 transmits a video signal DAT representing video to be displayed on a display unit 41 of the liquid crystal panel 40 and control signals TS such as a vertical synchronizing signal and a horizontal synchronizing signal, to the signal processing unit 20 every frame period. In addition, though a detailed description will be made later, transparent area information Ita indicating, for each pixel formation portion 42, whether the pixel formation portion is to perform transparent display is added to a vertical blanking period of the video signal DAT. The transparent gradation control circuit 21 having received the video signal DAT from the signal source 10 reads the transparent area information Ita added to the video signal DAT and provides the transparent area information Ita to the frequency conversion circuit 24. Note that the transparent area information Ita is the same information as LCD information Icd indicating whether the pixel formation portions 42 are transparent, in each embodiment which will be described later.

Then, the video signal DAT is inputted to the separating circuit 23. The separating circuit 23 separates an R component, a G component, and a B component from the video signal DAT, time-divides the color components, and outputs the time-divided color components in turn to the frequency conversion circuit 24. The frequency conversion circuit 24 converts the frequencies of the provided color components of the video signal DAT from $1/60$ seconds to $1/180$ seconds. In addition, the frequency conversion circuit 24 outputs the control signals TS and the transparent area information Ita which are included in the video signal DAT to the LCD timing control circuit 31.

The LCD timing control circuit 31 generates control signals SCT such as a source start pulse signal, a clock signal, and a latch strobe signal which are required to drive the source driver 32, and outputs the control signals SCT to the source driver 32, and generates control signals GCT such as a gate start pulse signal and a clock signal which are required to drive the gate driver 33, and outputs the control signals GCT to the gate driver 33, based on the control signals TS and transparent area information Ita provided from the frequency conversion circuit 24.

In addition, in order that the operation of the frequency conversion circuit 24 is synchronized with the operation of the source driver 32 and the gate driver 33, the LCD timing control circuit 31 also provides the control signals SCT and GCT for driving the source driver 32 and the gate driver 33, to the frequency conversion circuit 24. The frequency conversion circuit 24 provides the color components of the video signal DAT provided from the separating circuit 23 and the transparent area information Ita provided from the transparent gradation control circuit 21, to the source driver 32 based on the control signals SCT and GCT provided from the LCD timing control circuit 31.

In the display unit 41 of the liquid crystal panel 40 there are formed a plurality of source lines SL, a plurality of gate lines GL, and a plurality of pixel formation portions 42 provided at the respective intersections of the source lines SL and the gate lines GL. For the liquid crystal panel 40, a panel capable of performing fast response is used so that video of each of the color components can be displayed every $1/180$ seconds. Note that the display unit 41 shows only one pixel formation portion 42 connected to a source line SL and a gate line GL for convenience sake.

The source driver 32 generates driving signal voltages in turn for the color components from the R component, G component, and B component which are included in the video signal DAT and which are provided from the frequency conversion circuit 24, based on the control signals SCT provided from the LCD timing control circuit 31, time-divides the driving signal voltages, and applies the time-divided driving signal voltages in turn to the source lines SL; and applies, based on the transparent area information Ita, transparent gradation voltages Vt generated according to transparent gradation to pixel formation portions 42 that are to perform transparent display. The source driver 32 repeats this process every subframe period.

Generating scanning signals based on the control signals GCT provided from the LCD timing control circuit 31, the gate driver 33 applies the scanning signals in turn to the plurality of gate lines GL every subframe period, and thereby activates the gate lines GL one by one. The gate driver 33 repeats this process every subframe period.

The frequency conversion circuit 24 also provides the control signals TS and the transparent area information Ita to the LED timing control circuit 51 in order to control the light-on and light-off of the LEDs 53 which function as a backlight, in accordance with timing at which the driving signal voltages for the color components are applied to the pixel formation portions 42. The LED timing control circuit 51 generates a backlight control signal BCT for controlling the light-on and light-off of the LEDs 53, based on the control signals TS and the transparent area information Ita, and provides the backlight control signal BCT to the backlight drive circuit 52.

The red LEDs (Light Emitting Diodes) 53r, the green LEDs 53g, and the blue LEDs 53b that irradiate the liquid crystal panel 40 with red, green, and blue lights, respectively, are disposed on a back side of the liquid crystal panel 40. The backlight control signal BCT provided from the LED timing control circuit 51 includes the light-on times, light-off times, drive current values, and the like, of the LEDs 53r, 53g, and 53b of the respective colors. At this time, by increasing drive currents flowing through LEDs 53 that are disposed in a position corresponding to a pixel formation portion 42, the luminances of the LEDs increase, and accordingly, the pixel formation portion 42 in the position corresponding to the LEDs performs transparent display. Hence, the backlight drive circuit 52 allows the LEDs 53 to light at predetermined luminances or allows the LEDs 53 to go out, and allows a large drive current to flow through LEDs 53 provided in positions corresponding to pixel formation portions 42 that are to perform transparent display, based on the backlight control signal BCT provided from the LED timing control circuit 51. Note that the drive currents for the LEDs 53 are supplied from a power supply circuit which is not shown.

In the above-described manner, driving signal voltages and transparent gradation voltages Vt are applied to the source lines SL, scanning signals are applied to the gate lines GL, and the liquid crystal panel 40 is irradiated with lights of the respective colors in turn by the LEDs 53. By this, the driving signal voltages are applied to the respective pixel formation portions 42 of the display unit 41, by which video represented by the video signal DAT is displayed on the display unit 41. In addition, pixel formation portions 42 to which are applied the transparent gradation voltages Vt which are generated based on the transparent area information Ita become transparent, and accordingly, a background can be seen through the pixel formation portions 42.

<1.2 Operation of the Liquid Crystal Display Device>

Figure 2:
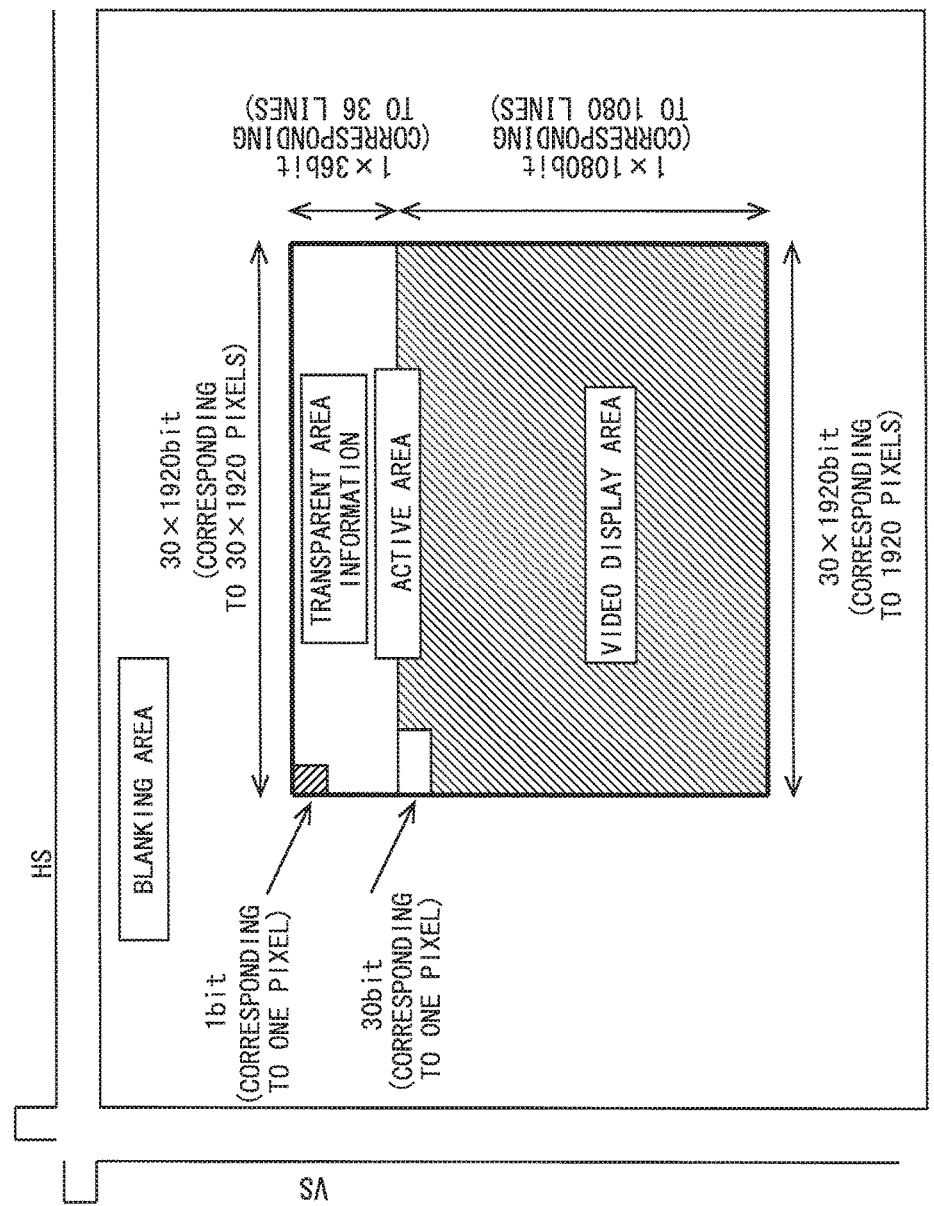
FIG. 2 is a diagram showing a relationship between a vertical blanking period to which transparent area information is added and a video display area for one frame period of the first embodiment.

FIG. 2 is a diagram showing a relationship between a vertical blanking period to which transparent area information is added and a video display area for one frame period of the present embodiment. A horizontal synchronizing signal HS shown in FIG. 2 defines one horizontal scanning period, and a vertical synchronizing signal VS defines one vertical scanning period. In one frame period defined by the horizontal synchronizing signal HS and the vertical synchronizing signal VS, an active area and a blanking area that surrounds the active area are set. The blanking area includes vertical blanking areas and horizontal blanking areas. In the blanking area shown in FIG. 2, areas above and below the video display area are the vertical blanking areas, and areas on the left and right sides of the video display area are the horizontal blanking areas. Note that although in FIG. 2 the vertical synchronizing signal VS and the horizontal synchronizing signal HS are described as signal waveforms for a positive logic case, these signals may be signal waveforms for a negative logic case.

The active area is an area including the video display area composed of 1920 pixels in a horizontal direction and 1080 pixels in a vertical direction; and a back porch period of the vertical blanking period to which transparent area information is added (hereinafter, referred to as "vertical blanking period" unless otherwise specified in the description of the present embodiment). Each pixel formation portion 42 is composed of red, green, and blue subpixels (not shown). If each of the color depths of the color components of the respective subpixels is 10 bits, then the number of bits A1 included in one horizontal scanning period of the video display area is found by the following equation (1):

$$A1=1920\times3\times10 \tag{1}$$

The transparent area information is, unlike the color depth of the video display area, 1-bit information indicating, for each pixel, whether the pixel is transparent. For example, when the transparent area information is "0", the pixel formation portion 42 is not transparent, and when the transparent area information is "1", the pixel formation portion 42 is transparent. Hence, the number of bits A2 of transparent area information required to indicate, for all pixels in the video display areas, whether the pixels are transparent is found by the following equation (2):

$$A2=1920\times1080\times1 \tag{2}$$

From the above equations (1) and (2), the number of lines Lv1 of the vertical blanking period that are required to add the transparent area information indicating, for all pixels, whether the pixels are transparent is found by the following equation (3):

$$Lv1=A2/A1=36 \tag{3}$$

From the above equation (3), to add the transparent area information indicating, for all pixels, whether the pixels are transparent, there is required a vertical blanking period corresponding to 36 lines, starting from the first data enable of the vertical blanking period. Since the transparent area information is provided to the vertical blanking period as a part of the active area, an active area included in a video signal DAT which is transmitted from the signal source 10 is (1080+36) lines. As such, the vertical blanking period to which the transparent area information is added is adjacent to the video display area. Note that the vertical blanking period is set to include at least 36 lines so that transparent area information for all pixel formation portions 42 can be added thereto.

Note that the above description describes a case in which the transparent area information added to the vertical blanking period is adjacent to the video display area; however, since it is also possible, for example, to determine that there is transparent area information, starting from five clocks after a fall of the vertical synchronizing signal VS, the transparent area information added to the vertical blanking period does not need to be adjacent to the video display area. In addition, although the above description describes a case in which the transparent area information is added to the back porch period of the vertical blanking period, the transparent area information may be added to a front porch period of the vertical blanking period. In this case, the transparent area information added to the front porch period is not information for the current frame period, but is information for the next frame period.

Figure 3:
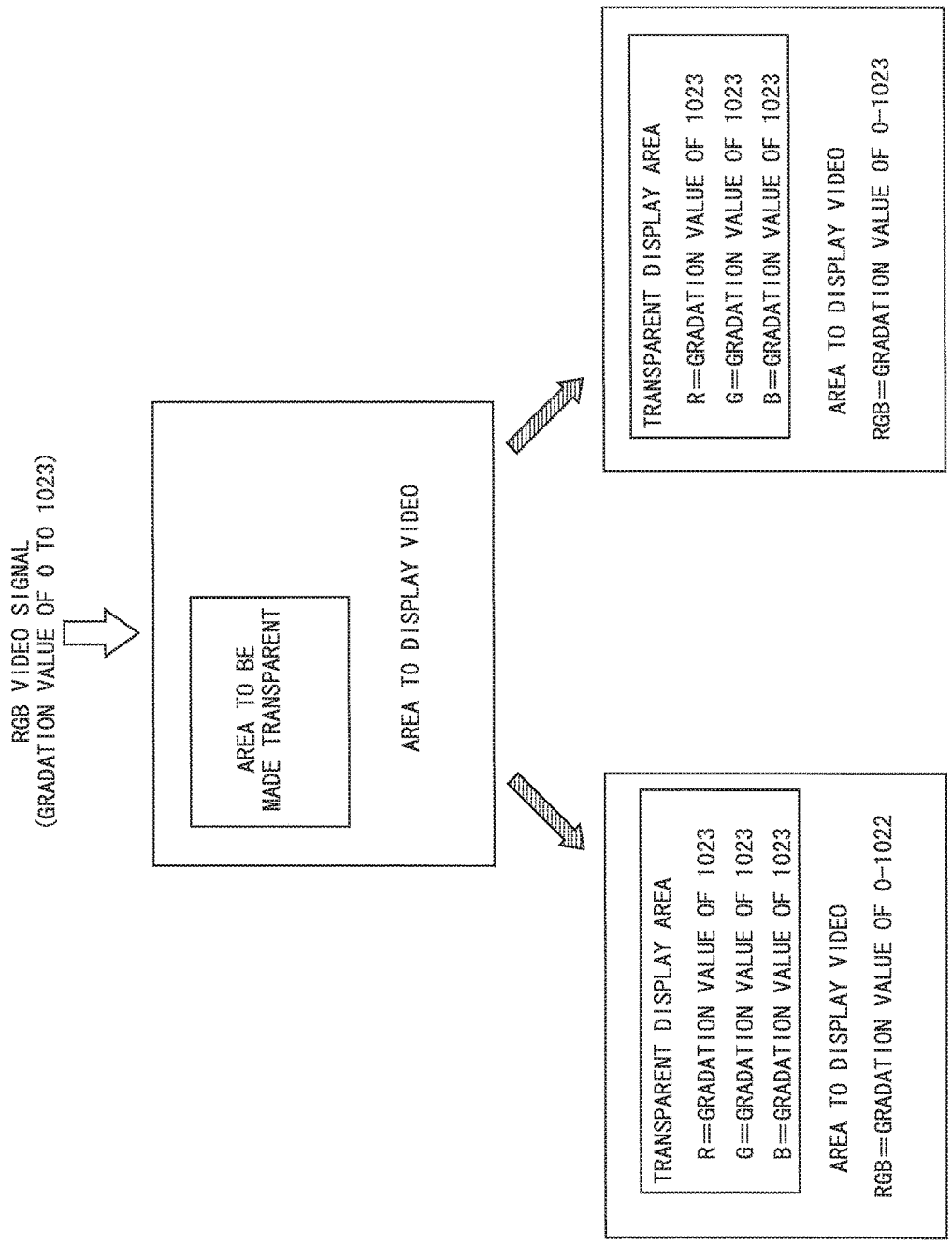
FIG. 3 is a diagram comparing a case in which transparent area information is represented by specific gradation values of respective color components, with a case in which transparent area information is added to a vertical blanking period in the first embodiment.

FIG. 3 is a diagram comparing a case in which transparent area information is represented by specific gradation values of respective color components, with a case in which transparent area information is added to a vertical blanking period. As shown in FIG. 3, video is displayed by an R component, a G component, and a B component with a color depth of 10 bits in an area of 1920×1080 pixels which is a video display area. For a case in which a transparent display area that is to be made transparent and that is composed of pixel formation portions 42 is provided in such a video display area, a case of the present embodiment will be described by comparing it with a conventional case.

Conventionally, in the transparent display area, 1023 gradation values of the respective color components are assigned to transparent gradation. Hence, when video is displayed in the video display area, the color components can only be represented in 1023 gradations with a gradation value of 0 to 1022, and pixel values (1023, 1023, 1023) need to be assigned to the transparent gradation. Accordingly, a color represented by those pixel values cannot be displayed.

In view of this, by adding transparent area information to a vertical blanking period of a video signal DAT, it becomes unnecessary to assign the pixel values (1023, 1023, 1023) to transparent gradation and thus those pixel values can also be used to display video. By this, the color components can be represented in 1024 gradations with a gradation value of 0 to 1023, enabling to display video in full-range color even when the transparent display area is provided.

Figure 4:
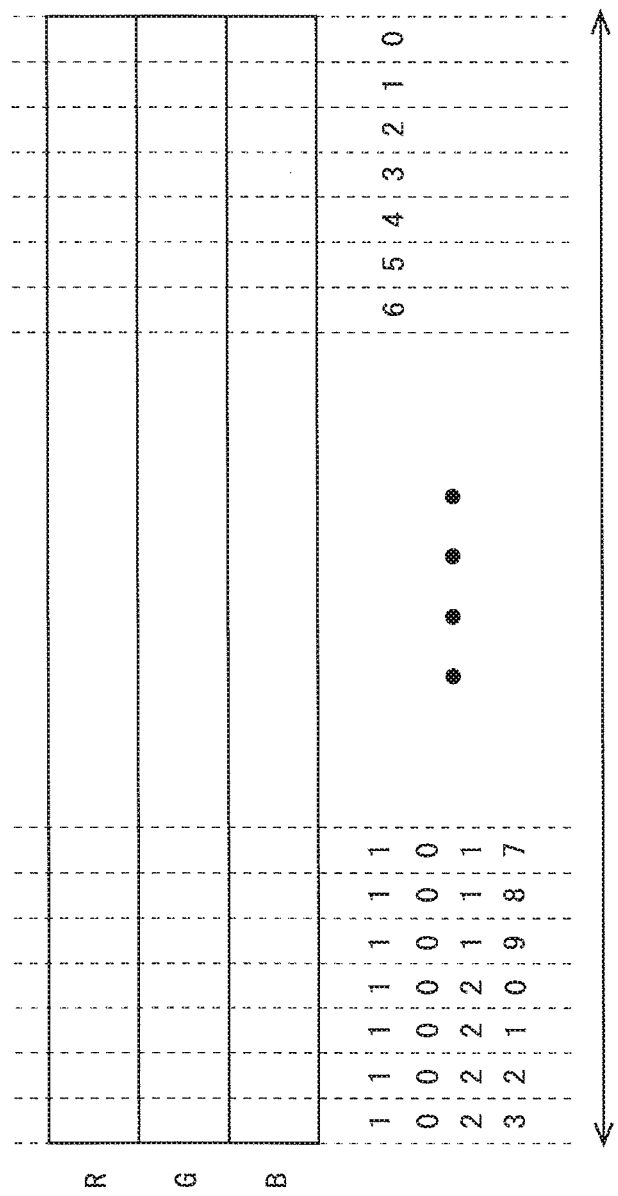
FIG. 4 is a diagram showing the gradation values of color components that can be used for video display by adding transparent area information to a vertical blanking period in a liquid crystal display device of a field sequential system in the first embodiment.
Figure 14:
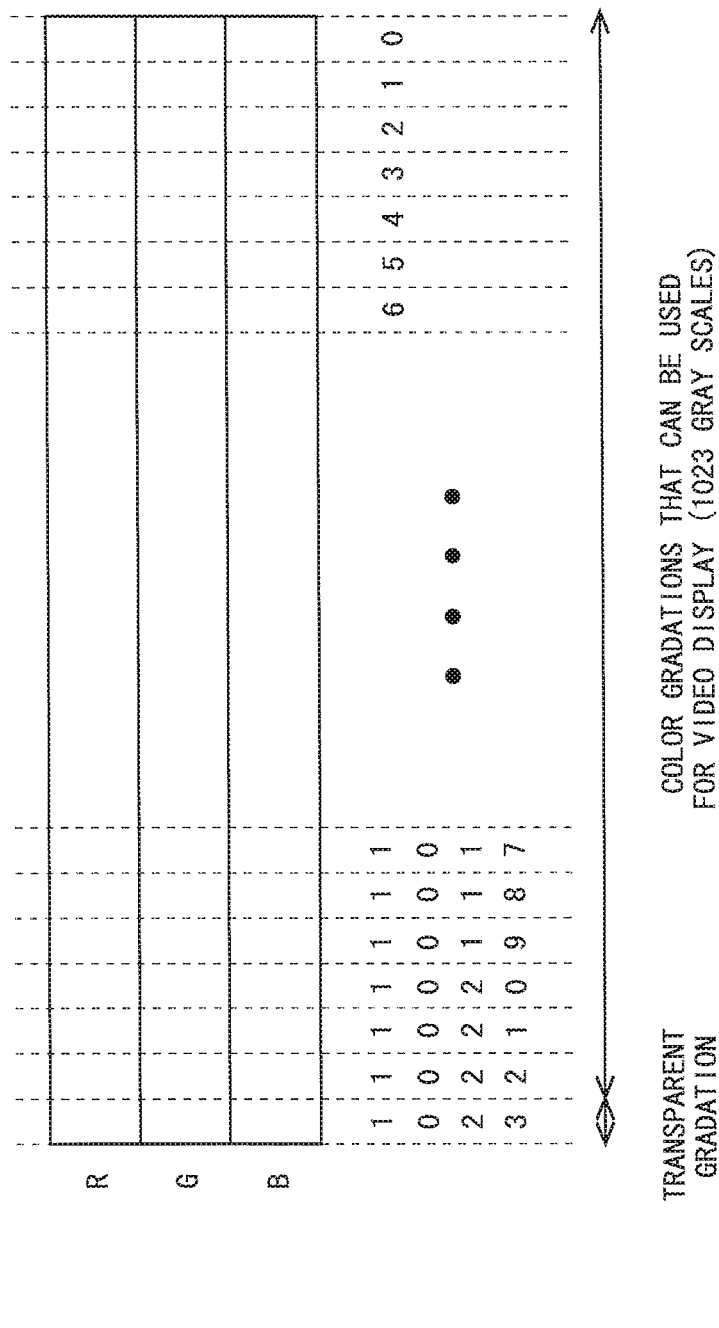
FIG. 14 is a diagram showing that a conventional liquid crystal display device of a field sequential system treats a specific gradation value as transparent gradation.

In addition, FIG. 4 is a diagram showing the gradation values of color components that can be used when video is displayed, by adding transparent area information to a vertical blanking period in a liquid crystal display device of a field sequential system. As shown in FIG. 4, when, for example, the color depth of each of the red, green, and blue color components included in a video signal DAT is 10 bits, each color can be displayed in 1024 gradations with a gradation value of 0 to 1023. By thus adding transparent area information to a vertical blanking period when transparent display is performed on the display unit 41 of the liquid crystal display device, unlike the case shown in FIG. 14, it becomes unnecessary to assign pixel values (1023, 1023, 1023) to transparent gradation, and accordingly, a color that is represented by those pixel values can also be used when video is displayed. As a result, the liquid crystal display device can display video in all colors even when performing transparent display.

<1.3 Effect>

According to the present embodiment, in a liquid crystal display device of a field sequential system, by adding transparent area information to a vertical blanking period, it becomes unnecessary to assign one of the color depths of an R component, a G component, and a B component to transparent gradation. By this, the liquid crystal display device can display video using all colors even when performing transparent display.

2. Second Embodiment

<2.1 Configuration of a Liquid Crystal Display Device>

Figure 5:
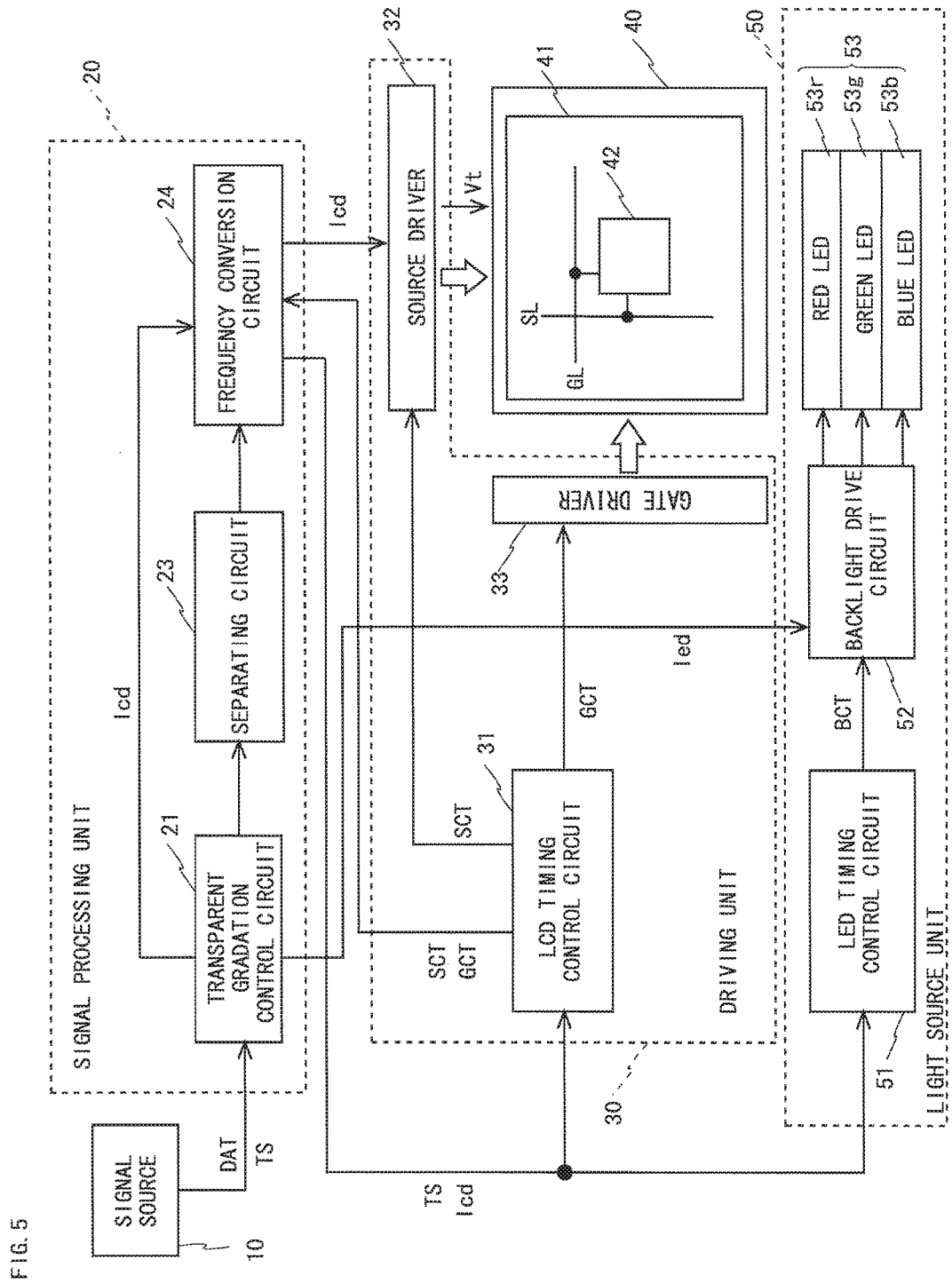
FIG. 5 is a block diagram showing a configuration of a liquid crystal display device according to a second embodiment of the present invention.

FIG. 5 is a block diagram showing a configuration of a liquid crystal display device according to a second embodiment of the present invention. Since the liquid crystal display device according to the present embodiment is composed of the same circuits as those composing the liquid crystal display device shown in FIG. 1, the circuits of the liquid crystal display device according to the second embodiment are denoted by the same reference characters as those of the circuits of the liquid crystal display device according to a first embodiment. Note, however, that since the liquid crystal display devices differ from each other in some of the connection destinations of a transparent gradation control circuit 21, the difference will be described.

As shown in FIG. 5, in the liquid crystal display device according to the present embodiment, unlike the case of the liquid crystal display device shown in FIG. 1, the transparent gradation control circuit 21 is not only connected to a separating circuit 23 and a frequency conversion circuit 24, but is also further connected to a backlight drive circuit 52. This is due to the following reason. In the liquid crystal display device shown in FIG. 1, transparent area information is represented by 1-bit information indicating, for each pixel, whether the pixel is transparent. However, in the present embodiment, though a detailed description will be made later, transparent area information not only includes information indicating, for each pixel formation portion 42, whether the pixel formation portion 42 is transparent (hereinafter, referred to as "LCD information Icd" in the present embodiment), but also further includes, when the pixel formation portion 42 is transparent, information for setting the transparency of the pixel formation portion 42 (hereinafter, referred to as "LED information Ied" in the present embodiment). Hence, the transparent gradation control circuit 21 is also connected to the backlight drive circuit 52 to provide the LED information Ied included in the transparent area information which is added to a vertical blanking period, to the backlight drive circuit 52. Note that the LCD information Icd may be referred to as "transparent display information" and the LED information Ied may be referred to as "transparency information".

In addition, since the liquid crystal display device is a see-through type display device where a background of a liquid crystal panel 40 can be seen through, the number of LEDs 53 disposed on aback side of the liquid crystal panel 40 is reduced over a normal case. In the present embodiment, in particular, since the transparencies of the pixel formation portions 42 are set by adjusting the luminances of the LEDs 53, it is preferred to dispose the LEDs 53 in one-to-one correspondence with the pixel formation portions 42, in order to set transparency on a per pixel formation portion 42 basis. However, when the number of the LEDs 53 is increased, it becomes difficult for light from the background to be transmitted through the liquid crystal panel 40 upon transparent display, making it difficult to see the background through the liquid crystal panel 40. Hence, it is preferred to increase the number of the LEDs 53 to the extent that the background of the liquid crystal panel 40 can be sufficiently seen.

Next, the LED information Ied which is provided to the liquid crystal display device will be described. Transparent area information to be used in the present embodiment indicates the transparency state of one pixel by 2-bit information, unlike transparent area information to be used in the first embodiment. In the 2-bit information, one bit is LCD information Icd indicating whether a pixel formation portion 42 is transparent. As in the case of the first embodiment, when the pixel formation portion 42 is not transparent, the LCD information Icd is 0, and when the pixel formation portion 42 is transparent, the LCD information Icd is "1".

The other one bit is LED information Ied indicating the transparency of the pixel formation portion 42 when the pixel formation portion 42 is transparent. The transparency of the pixel formation portion 42 is determined by the luminances of corresponding LEDs 53 of the respective colors. The higher the luminances of the LEDs 53 the higher the transparency of the pixel formation portion 42, and the lower the luminances of the LEDs 53 the lower the transparency of the pixel formation portion 42. Hence, by setting LED information Ied indicating the luminances of corresponding LEDs 53 to "0" or "1", a pixel formation portion 42 that is to perform transparent display can be set to either one of two levels of transparency. Specifically, by controlling the backlight drive circuit 52, the drive currents of the LEDs 53 are increased or reduced. By increasing the drive current values, the luminances of the LEDs 53 increase and thus the transparency of the pixel formation portion 42 increases. On the other hand, by reducing the drive current values, the luminances of the LEDs 53 decrease and thus the transparency of the pixel formation portion 42 decreases. In this manner, the liquid crystal display device can set the transparency of a pixel formation portion 42 that is to perform transparent display, based on LED information Ied included in transparent area information.

<2.2 Operation of the Liquid Crystal Display Device>

Figure 6:
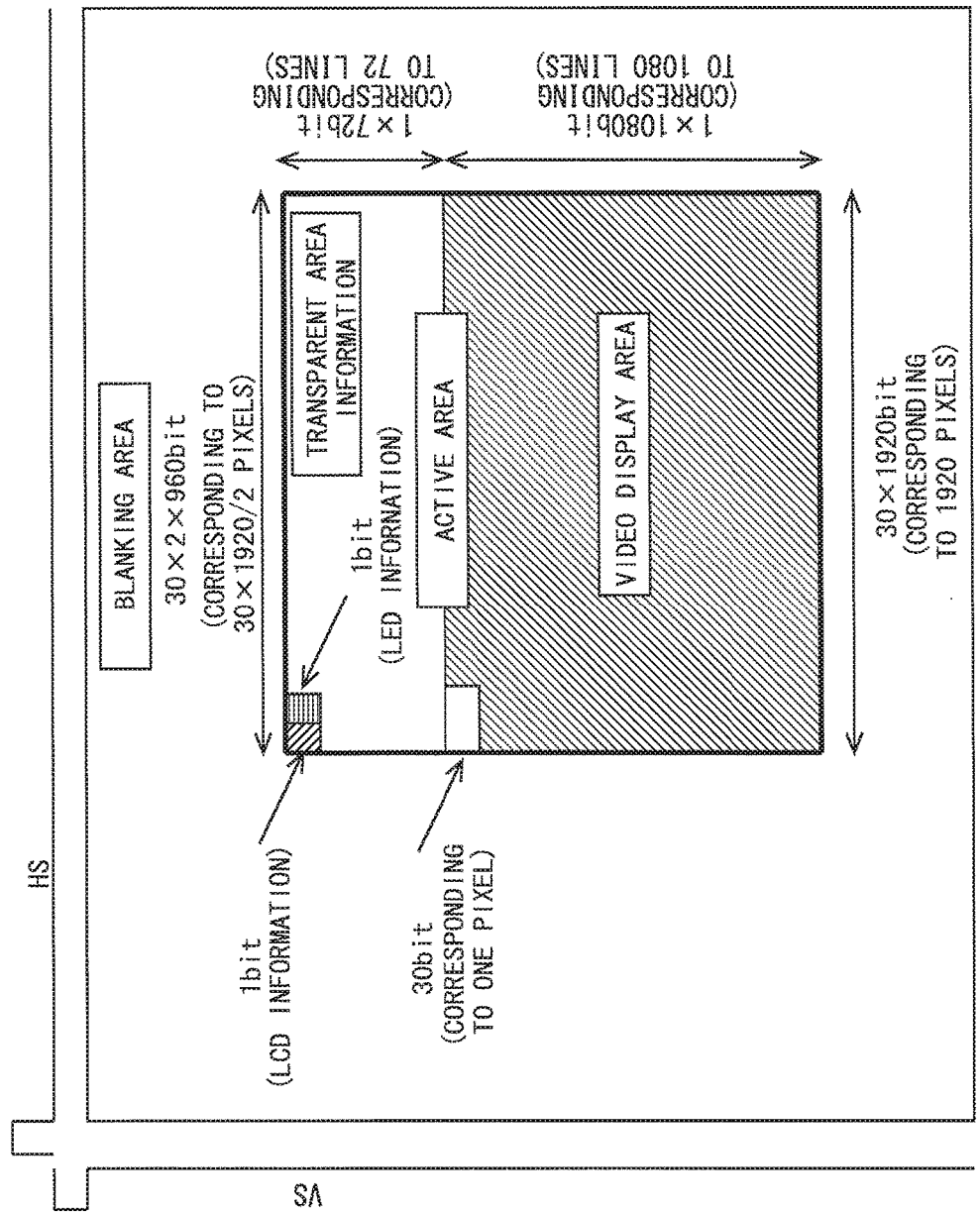
FIG. 6 is a diagram showing a relationship between a vertical blanking period to which transparent area information is added and a video display area for one frame period of the second embodiment.

FIG. 6 is a diagram showing a relationship between a vertical blanking period to which transparent area information is added and a video display area for one frame period of the present embodiment. As shown in FIG. 6, an active area is an area including the video display area composed of 1920 pixels in a horizontal direction and 1080 pixels in a vertical direction; and a back porch period of the vertical blanking period to which the transparent area information is added (hereinafter, referred to as "vertical blanking period" unless otherwise specified in the description of the present embodiment). Each pixel formation portion 42 is composed of three subpixels of red, green, and blue (not shown). If each of the color depths of the color components of the respective subpixels is 10 bits, then the number of bits B1 included in one horizontal scanning period of the video display area is found by the following equation (4):

$$B1 = 1920 \times 3 \times 10 \quad (4)$$

In addition, the transparent area information added to the vertical blanking period includes, unlike the number of bits of the video display area, information of two bits in total: 1-bit LCD information Icd indicating, for each pixel formation portion 42, whether the pixel formation portion 42 is transparent; and 1-bit LED information Ied indicating the transparency of the pixel formation portion 42 that is set to become see-through. Moreover, those pieces of information are provided consecutively. Therefore, a total number of bits B2 of the transparent area information for one frame period is found by the following equation (5):

$$B2 = 1920 \times 1080 \times 2 \quad (5)$$

From the above equations (4) and (5), the number of lines Lv2 of the vertical blanking period that are required to display transparent area information for all pixel formation portions 42 is found by the following equation (6):

$$Lv2 = B2/B1 = 72 \quad (6)$$

From the above equation (6), it can be seen that to provide the transparent area information for each pixel formation portion 42 in the video display area, there is required a vertical blanking period corresponding to 72 lines, starting from the first data enable of the vertical blanking period. Since the transparent area information is provided to the vertical blanking period as a part of the active area, an active area included in a video signal DAT which is transmitted from a signal source 10 is (1080+72) lines. As such, the vertical blanking period to which the transparent area information is added is adjacent to the video display area.

Note that although the above description describes that LED information is 1-bit information, the LED information may be multi-bit information. In this case, instead of setting the transparency of a pixel formation portion that performs transparent display to either one of two levels, the transparency can be set to more levels.

In addition, although the above description describes that transparent area information is added to a back porch period of a vertical blanking period, the transparent area information can also be added to a front porch period. In this case, the transparent area information added to the front porch period is not information for the current frame period, but is information for the next frame period.

<2.3 Effects>

According to the present embodiment, as in the case of the first embodiment, in a liquid crystal display device of a field sequential system, by adding transparent area information to a vertical blanking period, it becomes unnecessary to assign one of the color depths of an R component, a G component, and a B component to transparent area information. By this, the liquid crystal display device can display video using all colors even when performing transparent display.

Furthermore, transparent area information of the present embodiment not only includes LCD information Icd indicating whether a pixel formation portion 42 is transparent, but also includes, when the pixel formation portion 42 is transparent, LED information Ied for setting the transparency of the pixel formation portion 42. Hence, the liquid crystal display device can set the transparency of a pixel formation portion 42 that is to perform transparent display, by adjusting the luminances of LEDs 53 based on LED information Ied.

3. Third Embodiment

In a liquid crystal display device according to a third embodiment of the present invention, unlike a liquid crystal display device according to the first embodiment, 1-bit transparent area information is added to a horizontal blanking period. However, since a configuration of the liquid crystal display device according to the present embodiment is the same as that of the liquid crystal display device shown in FIG. 1, a block diagram and description of the liquid crystal display device according to the present embodiment are omitted.

<3.1 Operation of the Liquid Crystal Display Device>

Figure 7:
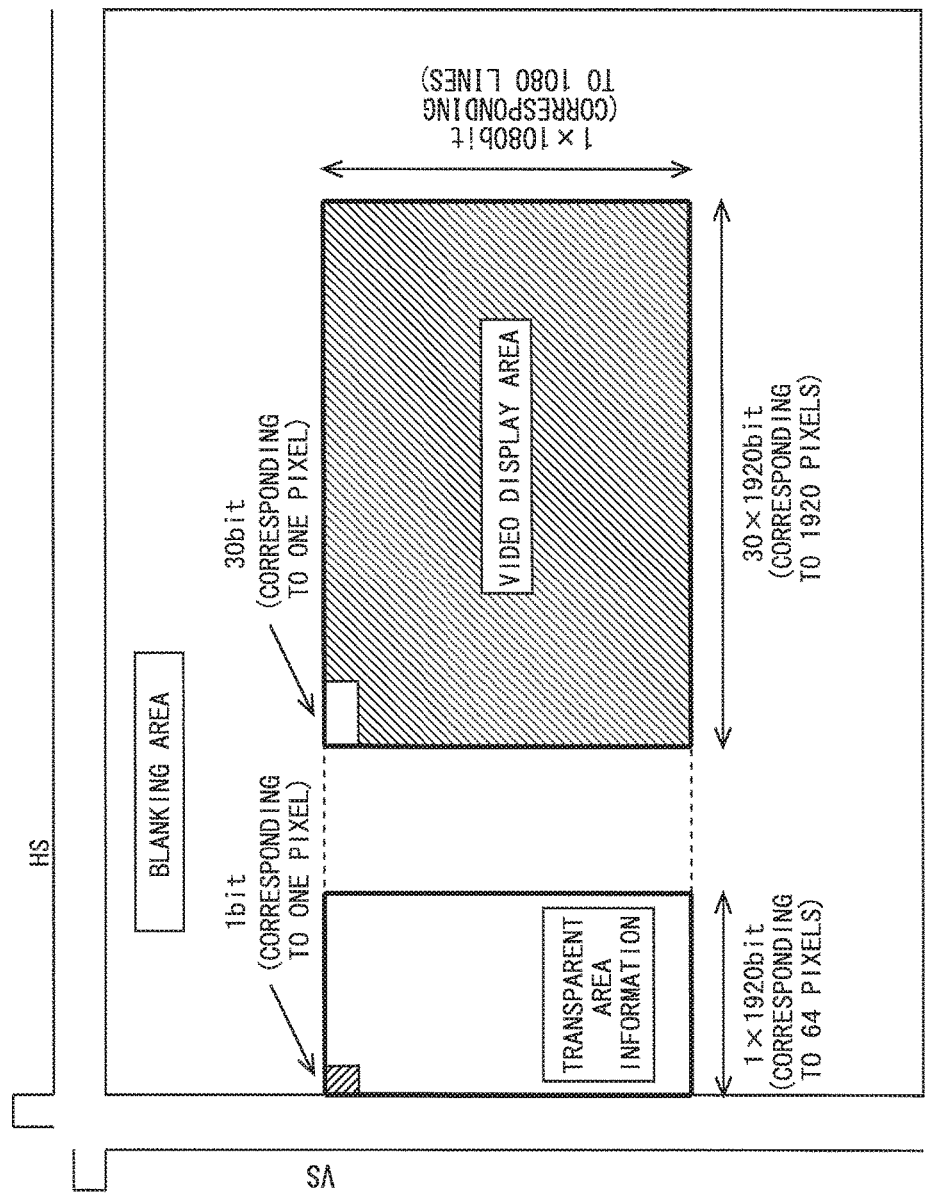
FIG. 7 is a diagram showing a relationship between a horizontal blanking period to which transparent area information is added and a video display area for one frame period of a third embodiment.

In the present embodiment, transparent area information is added to a back porch period of a horizontal blanking period (hereinafter, referred to as "horizontal blanking period" unless otherwise specified in the description of the present embodiment). FIG. 7 is a diagram showing a relationship between a horizontal blanking period to which transparent area information is added and a video display area for one frame period of the present embodiment.

As shown in FIG. 7, in the present embodiment, an active area includes the video display area composed of 1920 pixels in a horizontal direction and 1080 pixels in a vertical direction, and the horizontal blanking period to which transparent area information is added is not included in the active area. Each pixel formation portion 42 is composed of three subpixel of red, green, and blue (not shown). If each of the color depths of the subpixels is 10 bits, then the number of bits for one pixel formation portion 42 is (3×10) bits. On the other hand, the transparent area information includes only LCD information Icd indicating, for each pixel formation portion 42, whether the pixel formation portion 42 is transparent, and thus is one bit per pixel formation portion 42. Hence, the number of pixels Lh for transparent area information for 1920 pixels included in one horizontal scanning period (one line) of the video display area is found by the following equation (7):

$$Lh=1920/(3\times10)=64 \tag{7}$$

That is, to transmit transparent area information for pixels included in one line, for one line of the horizontal blanking period, transparent area information for 64 pixels is added. Hence, in the present embodiment, transparent area information is added for 64 pixels, starting from when a vertical synchronizing signal VS falls, every line of the horizontal blanking period.

As such, to provide transparent area information for each pixel formation portion 42 in the video display area, addition of transparent area information for 64 pixels every line, starting from the first data enable of the horizontal blanking period is repeatedly performed for 1080 lines. Since the transparent area information is added to the horizontal blanking period separately from the active area, a video signal DAT for 1920 pixels in the active area and transparent area information for 64 pixels, separately from the active area are transmitted every line from a signal source 10. Hence, as shown in FIG. 7, the horizontal blanking period to which the transparent area information is added is not adjacent to the video display area. In this case, the horizontal blanking period is set to include at least 64 pixels per line so that transparent area information for all pixel formation portions 42 can be added thereto.

Note that although the above description describes that transparent area information is added to a back porch period of a horizontal blanking period, the transparent area information can also be added to a front porch period. In this case, the transparent area information added to the front porch period is not information for the current frame period, but is information for the next frame period.

<3.2 Effect>

According to the present embodiment, in a liquid crystal display device of a field sequential system, by adding transparent area information to a horizontal blanking period, one of the color depths of an R component, a G component, and a B component does not need to be used as transparent gradation, as in a case in which transparent area information is added to a vertical blanking period. By this, the liquid crystal display device can display video using all colors even when performing transparent display.

<3.3 Variant>

Figure 8:
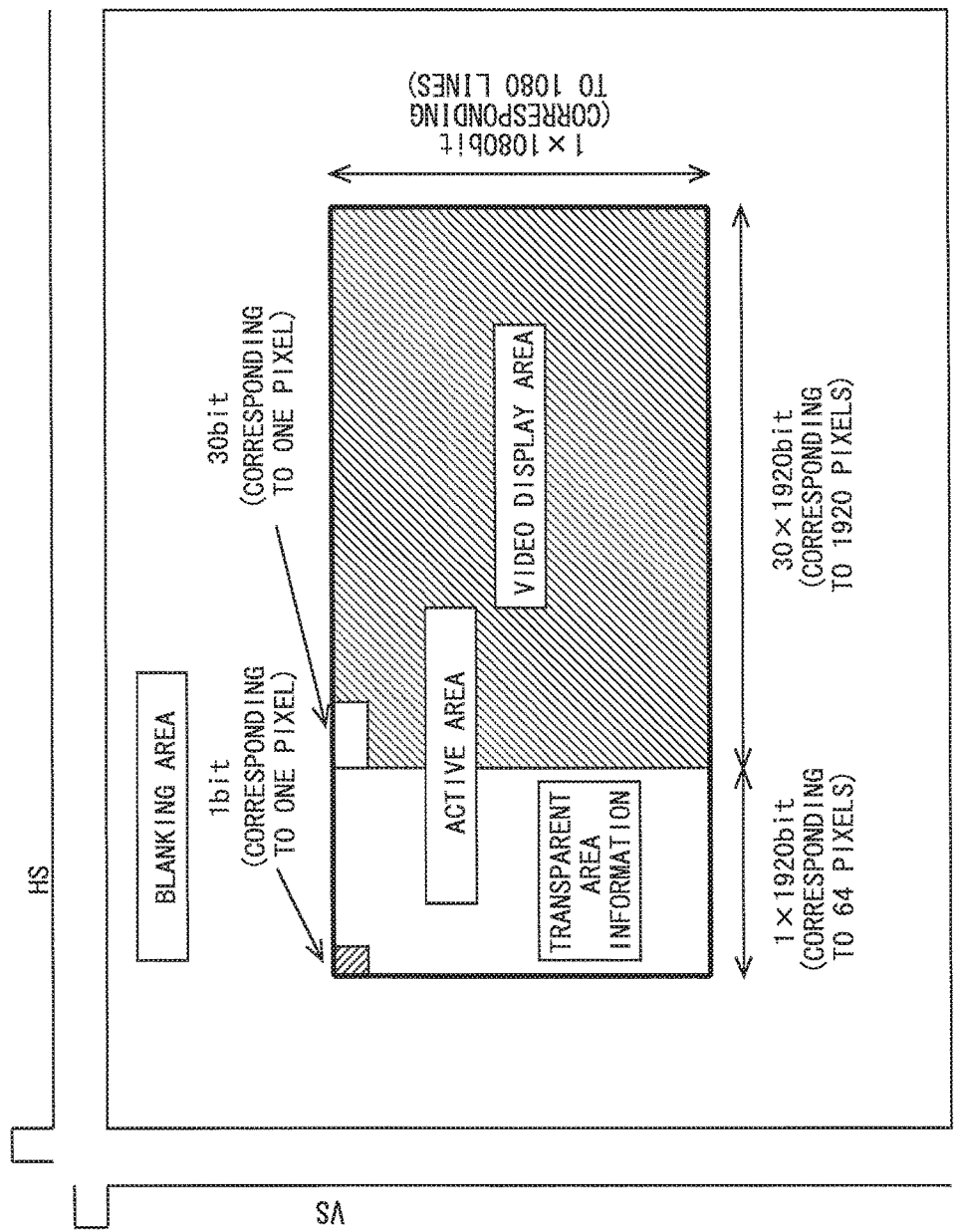
FIG. 8 is a diagram showing another relationship between a video display area and a horizontal blanking period to which transparent area information is added in one frame period, for one frame period of a variant of the third embodiment.

FIG. 8 is a diagram showing another relationship between a video display area and a horizontal blanking period to which transparent area information is added in one frame period. In the present embodiment, transparent area information is for 64 pixels, starting from when a vertical synchronizing signal VS falls. In this case, the horizontal blanking period to which the transparent area information is added is set in a position away from the video display area. Hence, as shown in FIG. 8, by increasing data enables which are transmitted from the signal source 10, an active area including a video display area and a horizontal blanking period to which transparent area information is added is formed. The active area includes, per line, 1984 pixels which are a total of 1920 pixels in the video display area and 64 pixels, starting from when a data enable rises, and further includes 1080 of such a line. Hence, unlike the case shown in FIG. 7, the video display area is adjacent to the transparent area information added to the horizontal blanking period. An effect obtained in this case is the same as that obtained by the liquid crystal display device shown in FIG. 7, and thus, description thereof is omitted.

In addition, in the present embodiment, transparent area information is 1-bit information. However, as in the case of the second embodiment, information of two or more bits may be added as transparent area information, within a range of bits that can be added to a horizontal blanking period.

4. Fourth Embodiment

In a liquid crystal display device according to a fourth embodiment of the present invention, as with a liquid crystal display device according to the second embodiment, transparent area information is represented by two bits. However, unlike the case of the second embodiment, one bit of 2-bit transparent area information is added to a vertical blanking period and the other one bit is added to a horizontal blanking period. Note that since a configuration of the liquid crystal display device according to the present embodiment is the same as that of the liquid crystal display device shown in FIG. 1, a block diagram and description thereof are omitted.

<4.1 Operation of the Liquid Crystal Display Device>

In the present embodiment, as in the case of the second embodiment, transparent area information which is transmitted from a signal source 10 includes 2-bit information. 1-bit information of the transparent area information is LCD information lcd that is "0" when each pixel formation portion 42 is not transparent, and is "1" when the pixel formation portion 42 is transparent. This information is information to be provided to a source driver 32 through a frequency conversion circuit 24. In addition, the other 1-bit information is LED information led indicating the transparency of a pixel formation portion 42 that is to perform transparent display. Specifically, when the LED information led is "0", the drive current value of each LED 53 is reduced to reduce the luminance of the LED 53, by which the transparency of a corresponding pixel formation portion 42 is set to a low value. When the LED information led is "1", the drive current value of each LED 53 is increased to increase the luminance of the LED 53, by which the transparency of a corresponding pixel formation portion 42 is set to a high value. By thus controlling the luminances of LEDs 53 by LED information led, the transparency of a pixel formation portion 42 that is to perform transparent display can be set.

Figure 9:
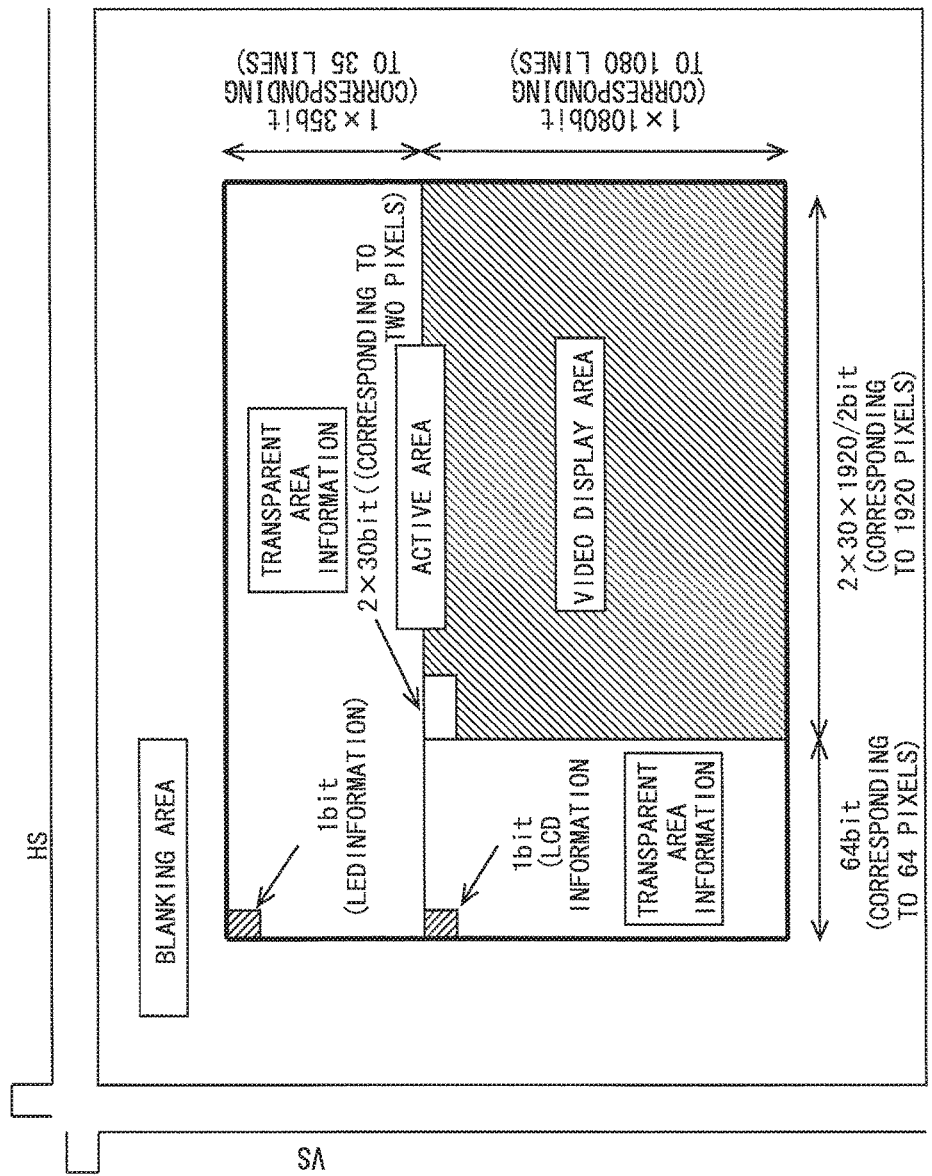
FIG. 9 is a diagram showing a relationship between a vertical and a horizontal blanking period to which transparent area information is added and a video display area for one frame period of a fourth embodiment.

FIG. 9 is a diagram showing a relationship between a vertical and a horizontal blanking period to which transparent area information is added and a video display area for one frame period of the present embodiment. In the present embodiment, when the color depth of each of an R component, a G component, and a B component is 10 bits and each of LCD information and LED information is 1 bit, the LED information is transmitted added to a vertical blanking period and the LCD information is transmitted added to a horizontal blanking period.

The number of pixels in the video display area is 1920× 1080 pixels. To transmit LCD information for one horizontal period, there is required LCD information for 64 pixels every horizontal period, as is found in the third embodiment. Hence, the width in a horizontal direction of an active area corresponds to 1984 pixels which are a total of 1920 pixels in the video display area and 64 pixels.

In addition, the number of bits of information required to add LED information to the vertical blanking period is represented by the following equation (8):

$$C1=1920\times1080\times1 \tag{8}$$

Each pixel formation portion 42 is composed of three subpixels of red, green, and blue. If the color depth of each subpixel is 10 bits, then since the width in the horizontal direction of the active area that includes pixels for the horizontal blanking period to which the LCD information is added is, as described above, 1984 pixels, the number of bits C2 thereof is found by the following equation (9):

$$C2 = 1984 \times 3 \times 10 \quad (9)$$

From the above equations (8) and (9), the number of lines Lv3 required when the LED information is added to the vertical blanking period is found by the following equation (10):

$$Lv3 = C1/C2 = 35 \quad (10)$$

As a result, the number of lines in a vertical direction of the active area is (35+1080) lines.

Hence, in a video signal DAT transmitted from the signal source 10, first, LED information for 35 lines, starting from the first data enable of the vertical blanking period is transmitted. When the transmission of the LED information is completed, LCD information for 64 pixels (for one line), starting from the first data enable of the horizontal blanking period is transmitted. Then, a video signal DAT for 1920 pixels (for one line) is transmitted. When the transmission of the LCD information and the video signal DAT for one line is completed, transmission of LCD information and a video signal DAT for the next one line is performed. In this manner, LCD information and a video signal DAT for 1080 lines in total are transmitted on a line-by-line basis. In this manner, a video signal and transparent area information which are included in the active area are transmitted.

<4.2 Effects>

According to the present embodiment, as in the case of the second embodiment, in a liquid crystal display device of a field sequential system, by adding LCD information to a horizontal blanking period, it becomes unnecessary to use, as transparent gradation, one of the color depths of an R component, a G component, and a B component. By this, the liquid crystal display device can display video using all colors even when performing transparent display. In addition, by adding LED information to a vertical blanking period, the liquid crystal display device can set transparency by adjusting, based on the information, the luminance of an LED 53 of each color included in a backlight unit.

Note that by using multi-bit information as transparency information, as in the case of the second embodiment, instead of setting the transparency of a pixel formation portion that performs transparent display to either one of two levels, the transparency can also be set to more levels.

In addition, it is described that LED information is added to a vertical blanking period and LCD information is added to a horizontal blanking period. However, the LED information may be added to the horizontal blanking period and the LCD information may be added to the vertical blanking period. In this case, too, the same effects as those described above can be obtained.

5. Fifth Embodiment

In a liquid crystal display device according to a fifth embodiment of the present invention, unlike liquid crystal display devices according to the above-described first to fourth embodiments, transparent area information is added to a video signal DAT instead of being added to a vertical or horizontal blanking period. Specifically, new bits are added separately from bits representing the color depths of an R component, a G component, and a B component which are included in a video signal DAT, and the added bits are assigned to transparent area information. Note that since a configuration of the liquid crystal display device according to the present embodiment is the same as that of the liquid crystal display device shown in FIG. 1, a block diagram and description thereof are omitted.

Figure 10:
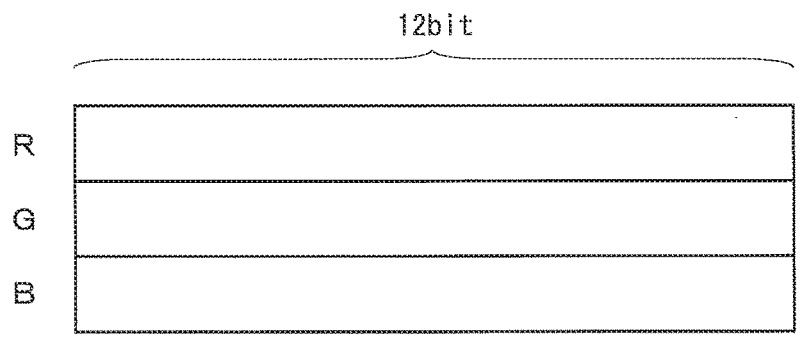
FIG. 10 is a diagram showing the way of using bits representing the color depths of an R component, a G component, and a B component which are included in a video signal in a fifth embodiment, and more specifically, (A) of FIG. 10 is a diagram showing the bits of each of the R component, the G component, and the B component, and (B) of FIG. 10 is a diagram showing bits representing the color depth of each of the R component, the G component, and the B component, and bits assigned to transparent area information.
Figure 10:
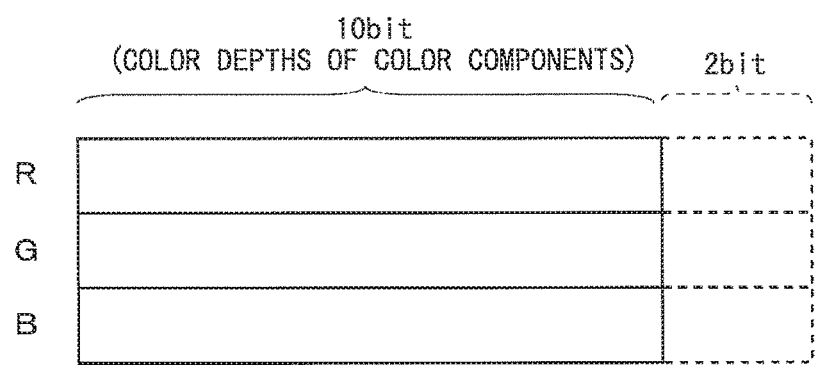
Figure 10:
Figure 10:
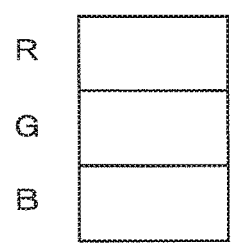

In the present embodiment, unlike the case of the above-described embodiments, each of the color components of a video signal DAT is assigned, as a 10-bit signal, to the color depth of the color component, and each of the color components is extended by further adding two bits thereto and the added two bits are assigned to transparent area information. Hence, each of the color components of the video signal is apparently 12 bits. FIG. 10 is a diagram showing the way of using bits representing the color depths of an R component, a G component, and a B component which are included in a video signal DAT. More specifically, (A) of FIG. 10 is a diagram showing the bits of each of the R component, the G component, and the B component, and (B) of FIG. 10 is a diagram showing bits representing the color depth of each of the R component, the G component, and the B component, and bits assigned to transparent area information. As shown in FIG. 10, the bits of the R component, the G component, and the B component are all extended to 12 bits. However, of the bits of each of the color components, 10 bits are used to assign the color depth of video and the other 2 bits are assigned to transparent area information.

When 2-bit transparent area information which is added to a video signal DAT is read by a transparent gradation control circuit 21 of the liquid crystal display device, of 2-bit information included in the transparent area information, 1-bit information is provided, as LCD information, to a frequency conversion circuit 24 and the other one bit is provided, as LED information, to a backlight drive circuit 52. Subsequent operation of the liquid crystal display device is the same as that for the case described in the fourth embodiment and thus description thereof is omitted.

According to the present embodiment, in the liquid crystal display device, the color depth of each of the color components can be represented by 10 bits. By this, it becomes unnecessary to assign pixel values (1023, 1023, 1023) to transparent gradation, and accordingly, a color represented by those pixel values can also be used when video is displayed. As a result, the liquid crystal display device can display video using all colors even when performing transparent display.

Note that in the above-described embodiment, in order to add LCD information and LED information which are included in transparent area information, 2 bits are added to 10 bits representing each of the color depth of the color components of a video signal. However, for example, only LCD information may be added to one bit out of the added two bits and LED information may be added to a horizontal blanking period or a vertical blanking period, or only LED information may be added to one bit out of the added two bits and LCD information may be added to a horizontal blanking period or a vertical blanking period. The bits that are added to 10 bits representing each of the color depth of the color components of a video signal, in order to add transparent area information may be referred to as "added transparent area".

6. Sixth Embodiment

A liquid crystal display device according to the present embodiment is not a liquid crystal display device of a field sequential system that is described in the first to fifth embodiments, but is a liquid crystal display device of a color filter system. Moreover, the liquid crystal display device is not of a see-through type, but is a display device that displays, for example, only color video every 1/60 seconds.

<6.1 Operation of the Liquid Crystal Display Device>

Figure 11:
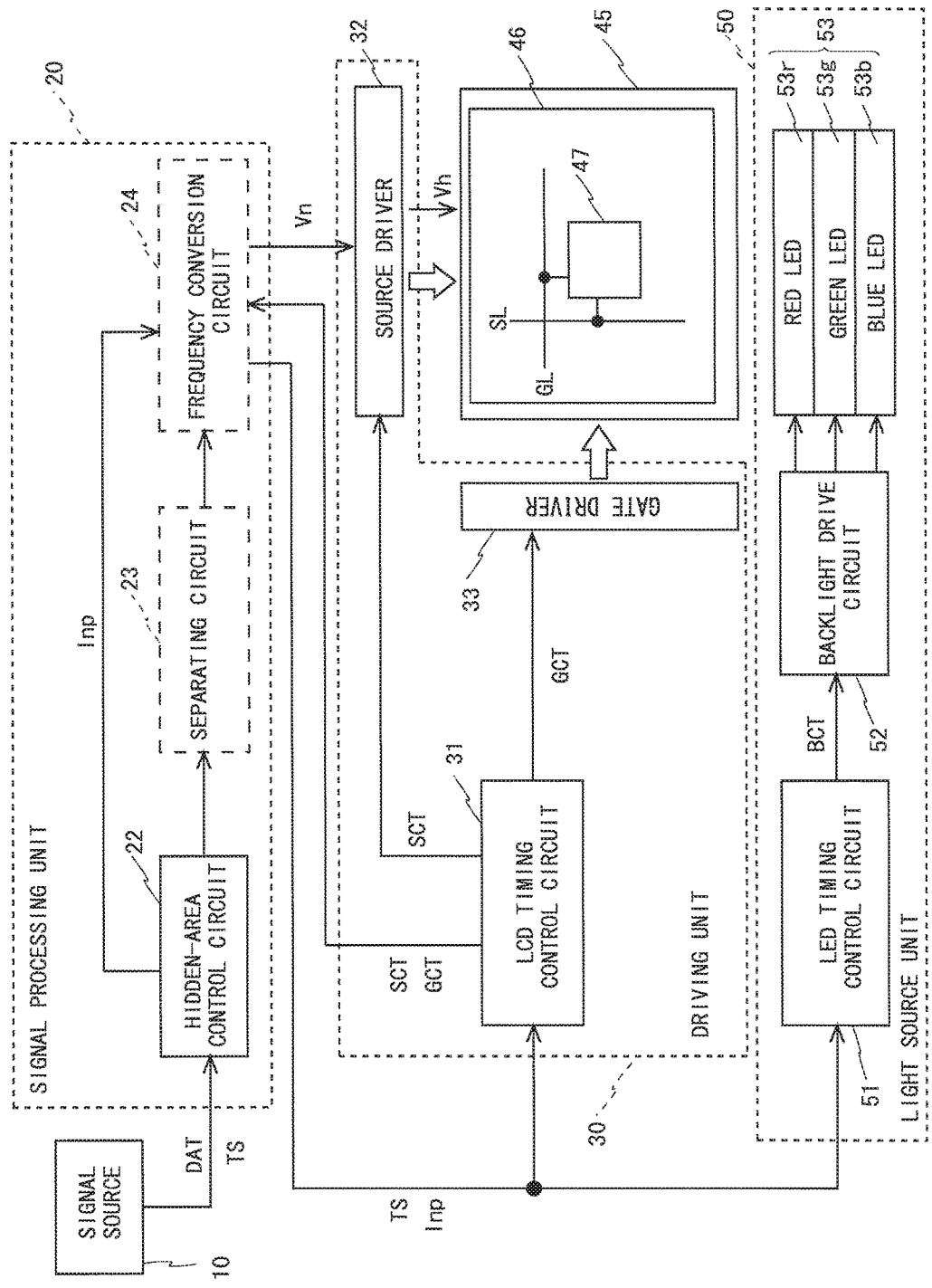
FIG. 11 is a block diagram showing a configuration of a liquid crystal display device according to a sixth embodiment.

FIG. 11 is a block diagram showing a configuration of a liquid crystal display device according to the present embodiment. As shown in FIG. 11, the configuration of the liquid crystal display device is substantially the same as that of the liquid crystal display device shown in FIG. 1. However, in the liquid crystal display device, instead of transparent area information, hidden-area information is added to a vertical blanking period. When fill information Inp included in the hidden-area information is "0", video is displayed on a corresponding pixel formation portion 47 in a display unit 46 of a liquid crystal panel 45, and when the fill information Inp is "1", the pixel formation portion 47 is filled so as not to display video. Hence, the liquid crystal display device is provided with a hidden-area control circuit 22 instead of a transparent gradation control circuit 21. The hidden-area control circuit 22 reads fill information Inp added to the vertical blanking period, and provides the fill information Inp to a source driver 32, an LCD timing control circuit 31, and an LED timing control circuit 51.

The source driver 32 generates driving signal voltages in turn for color components from an R component, a G component, and a B component which are included in a video signal DAT and which are provided from a frequency conversion circuit 24, based on control signals SCT provided from the LCD timing control circuit 31, time-divides the driving signal voltages, and applies the time-divided driving signal voltages in turn to source lines SL. In addition, application of fill gradation voltages Vn generated according to fill gradations to pixel formation portions 47 to be filled based on the fill information Inp is repeated every subframe period.

The liquid crystal display device according to the present embodiment is not a display device of a field sequential system, and thus does not need to include or may include a separating circuit 23 and the frequency conversion circuit 24. Note, however, that when the separating circuit 23 and the frequency conversion circuit 24 are included as shown in FIG. 11, the operation thereof needs to be stopped. Hence, in FIG. 11, in order to show that the operation of the separating circuit 23 and the frequency conversion circuit 24 is stopped, the separating circuit 23 and the frequency conversion circuit 24 are enclosed by dashed lines.

When the separating circuit 23 and the frequency conversion circuit 24 are left and the operation thereof is stopped, only by changing a liquid crystal panel 40 included in the liquid crystal display device shown in FIG. 1 to the liquid crystal panel 45 having color filters formed therein, even when information added to the vertical blanking period is hidden-area information, the liquid crystal display device can display video using a color filter system, or can fill a hidden pixel formation portion 47 so that video cannot be displayed thereon. As such, in the liquid crystal display device shown in FIG. 1, only by changing the liquid crystal panel 40 of a field sequential system to the liquid crystal panel 45 of a color filter system, a liquid crystal display device that can be used in the present embodiment can be manufactured. By this, the manufacturing cost of a liquid crystal display device that can be used in the present embodiment can be suppressed to a low cost.

Figure 12:
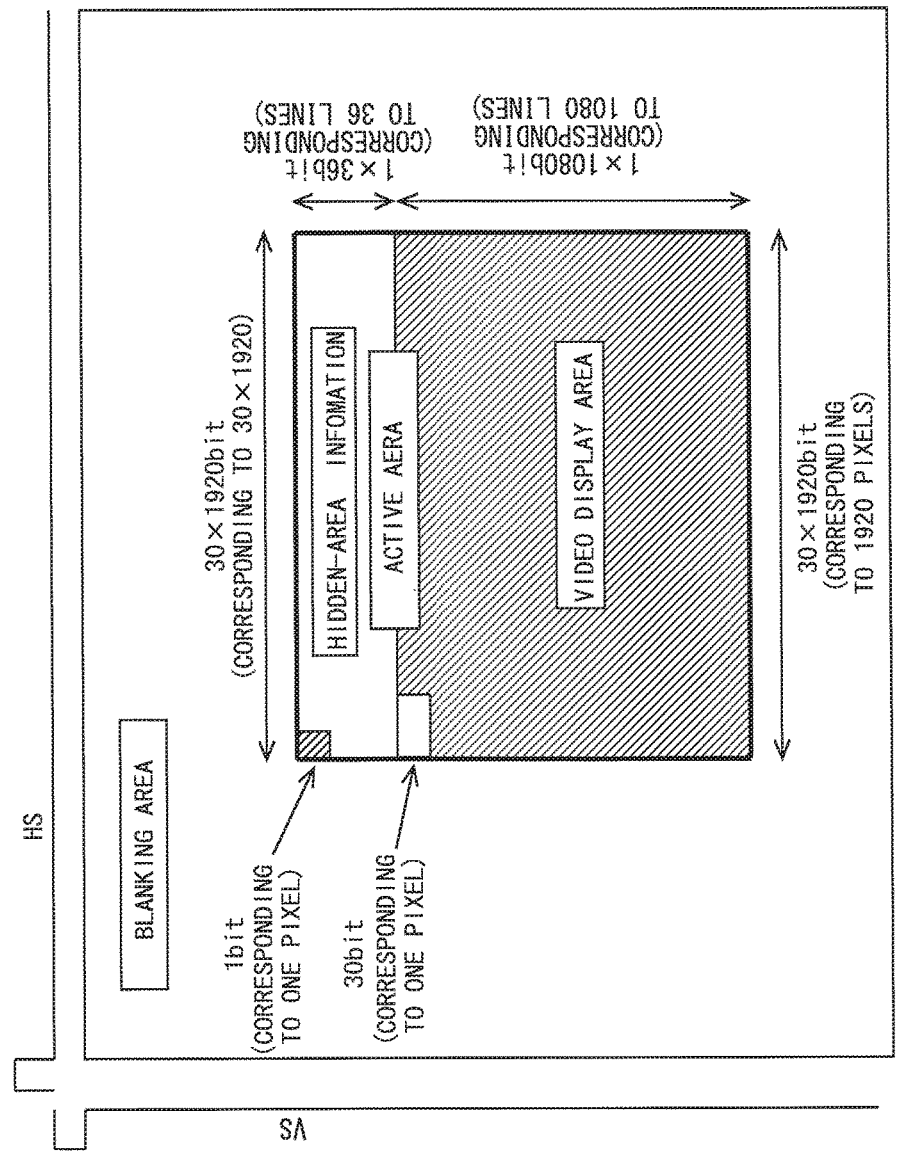
FIG. 12 is a diagram showing a relationship between a video display area and a vertical blanking period to which hidden-area information is added for one frame period of the sixth embodiment.

FIG. 12 is a diagram showing a relationship between a video display area and a vertical blanking period to which hidden-area information is added for one frame period of the present embodiment. The present embodiment corresponds to a case in which, in the case of the first embodiment, instead of transparent area information, hidden-area information is added to a vertical blanking period. Hence, as shown in FIG. 12, as the number of lines that are required to add 1-bit hidden-area information for each of 1920×1080 pixels in the video display area to the vertical blanking period of the video display area, 36 lines are required, as is found in the first embodiment. Hence, (36+1080) lines which are a total of 1080 lines in the video display area and 36 lines where the hidden-area information is added become an active area to be transmitted from a signal source 10. Note that the hidden-area information may be added to a horizontal blanking period, instead of being added to the vertical blanking period.

In addition, hidden-area information may be represented by a plurality of bits, and a part of the bits may be used as, for example, character information for displaying a character, etc., on a filled pixel. In this case, LCD information and the character information that are included in the hidden-area information may be collectively added to either one of the vertical blanking period and the horizontal blanking period, or, for example, the LCD information may be provided to either one of the vertical blanking period and the horizontal blanking period and the character information may be added to the other blanking period.

<6.2 Effects>

According to the present embodiment, by adding hidden-area information to a vertical blanking period, it becomes unnecessary to assign one of the color depths of an R component, a G component, and a B component to hidden-area information. By this, the liquid crystal display device can represent video in all colors even when providing a hidden area where video is not displayed.

In addition, a pixel formation portion 47 filled with a predetermined color can be provided in the display unit 46 of the liquid crystal panel 45, or for example, a black character can be displayed on a pixel formation portion 47 filled with white, etc.

Note that, in the present specification, transparent area information and hidden-area information may be collectively referred to as "display area information", and the states of a pixel formation portion 47 including a transparent state and a fill state may be collectively referred to as "display state".

7. Others

In the above-described first to fifth embodiments, a liquid crystal display device time-divides one frame period into three subframe periods using a field sequential system, and time-divides red, green, and blue video and displays the time-divided videos in turn during the respective subframe periods, and thereby displays color video.

Figure 13:
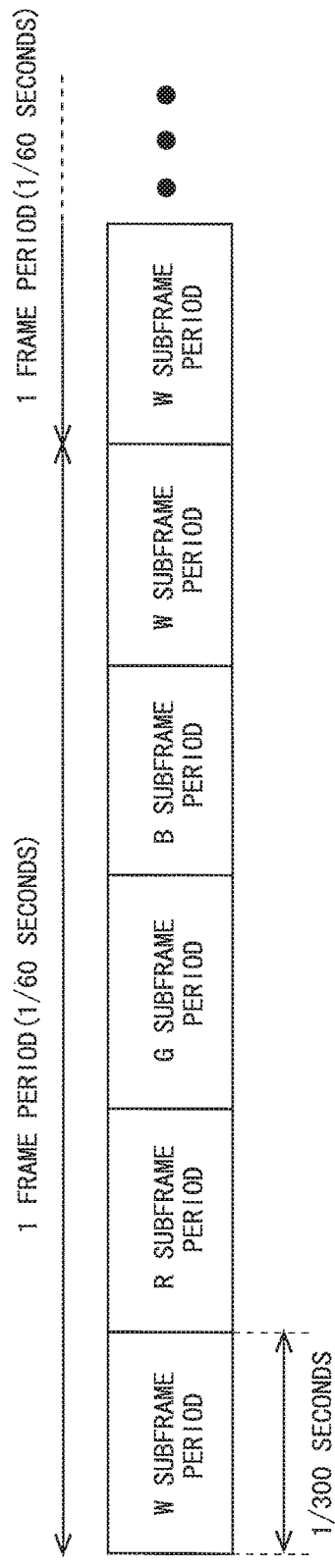
FIG. 13 is a diagram showing an example of a case in which one frame period is divided into five subframe periods in a variant of the first to fifth embodiments.

However, a liquid crystal display device according to the present embodiment can also divide one frame period into more subframe periods. FIG. 13 is a diagram showing an example of a case in which one frame period is divided into five subframe periods. For example, as shown in FIG. 13, one frame period may be composed of five subframe periods by adding white subframe (W subframe) periods during which white video is displayed, before and after subframe periods during which red, green, and blue videos are displayed. Such driving can also be implemented by the liquid crystal display device shown in FIG. 1 or 5. Specifically, the separating circuit 23 separates an R component, a G component, and a B component which are included in a video signal on a frame-period-by-frame-period basis, and the frequency conversion circuit 24 provides W subframe periods before and after reading the R component, the G component, and the B component, and simultaneously reads the color components during the W subframe periods. In this case, since five subframe periods are provided in 1/60 seconds which is one frame period, the frequency conversion circuit 24 needs to convert each subframe period to 1/300 seconds.

INDUSTRIAL APPLICABILITY

The present invention is applicable to display devices such as a liquid crystal display device that performs color display using a field sequential system or a color filter system.

DESCRIPTION OF REFERENCE CHARACTERS

10: SIGNAL SOURCE
20: SIGNAL PROCESSING UNIT
21: TRANSPARENT GRADATION CONTROL CIRCUIT
22: HIDDEN-AREA CONTROL CIRCUIT
23: SEPARATING CIRCUIT
24: FREQUENCY CONVERSION CIRCUIT
30: DRIVING UNIT
31: LCD TIMING CONTROL CIRCUIT
32: SOURCE DRIVER
33: GATE DRIVER
40 and 45: LIQUID CRYSTAL PANEL
41 and 46: DISPLAY UNIT
42 and 47: PIXEL FORMATION PORTION
50: LIGHT SOURCE UNIT
51: LED TIMING CONTROL CIRCUIT
52: BACKLIGHT DRIVE CIRCUIT
53: LED
Ita: TRANSPARENT AREA INFORMATION
Icd: LCD INFORMATION (TRANSPARENT AREA INFORMATION)
Ied: LED INFORMATION (TRANSPARENT AREA INFORMATION)
Inp: FILL INFORMATION (HIDDEN-AREA INFORMATION)

The invention claimed is:

1. A liquid crystal display device that displays video represented by a video signal inputted from a signal source, the liquid crystal display device comprising:
a display unit including a plurality of pixel formation portions;
a driving unit configured to display the video on the display unit, based on the video signal; and
a signal processing unit configured to control display states of the pixel formation portions, based on inputted display area information, the display area information being added to the video signal, the signal processing unit includes a transparent gradation control circuit, a separating circuit, and a frequency conversion circuit, wherein
the display area information is provided added to the video signal, and
the driving unit controls a display state of a pixel formation portion that is identified by the display area information, and displays the video on a pixel formation portion that is not identified by the display area information,
in order to irradiate the display unit with light, the liquid crystal display device divides one frame period into a plurality of subframe periods and further comprises a light source unit including: light sources of a plurality of colors that are configured to emit lights of specified colors during the respective subframe periods; and a backlight drive circuit configured to drive the light sources, by which screens of different colors are displayed during the respective subframe periods,
the display area information is transparent area information including transparent display information indicating, for each of the pixel formation portions, whether the pixel formation portion is to perform transparent display,
the transparent gradation control circuit is configured to read the transparent display information from the display area information added to the video signal; the separating circuit is connected to the transparent gradation control circuit and configured to separate the video signal for the one frame period by color; and the frequency conversion circuit is configured to read, from the separating circuit, the video signals separated for the respective colors; the signal processing unit performs frequency conversion on the video signals and provides to the driving unit the frequency-converted video signals together with the transparent display information read by the transparent gradation control circuit the video signals displaying a screen of one color or screens of two or more colors, and
the driving unit performs transparent display on a pixel formation portion that is identified by the transparent display information, and displays the video on a pixel formation portion that is not identified by the transparent display information.

2. The liquid crystal display device according to claim 1, wherein the transparent area information is added to at least any one of a vertical blanking period and a horizontal blanking period of the video signal and an added transparent area of the video signal.

3. The liquid crystal display device according to claim 2, wherein
the transparent area information further includes transparency information for setting a transparency of a pixel formation portion that performs transparent display, by controlling luminances of the light sources, and
the light sources are composed of light emitting diodes disposed for one or two or more pixel formation portions, and the backlight drive circuit controls the luminances by adjusting drive current values of the light emitting diodes, based on the transparency information.

4. The liquid crystal display device according to claim 3, wherein the transparent area information is added to a back porch period or a front porch period of the vertical blanking period or the horizontal blanking period.

5. The liquid crystal display device according to claim 3, wherein at least either one of the transparent display information and the transparency information is added, every horizontal scanning period, to the horizontal blanking period, starting from when a vertical synchronizing signal falls or rises.

6. The liquid crystal display device according to claim 3, wherein at least either one of the transparent display information and the transparency information is added to the horizontal blanking period adjacent to an area where the video signal is displayed.

7. The liquid crystal display device according to claim 1, wherein the transparent area information is added to at least either one of a vertical blanking period and a horizontal blanking period of the video signal and to an added transparent area of the video signal.

8. The liquid crystal display device according to claim 1, wherein the transparent display information and the transparency information are added consecutively to any one of the vertical blanking period, the horizontal blanking period, and the added transparent area of the video signal.

9. The liquid crystal display device according to claim 1, wherein the transparent display information is added to any one of the vertical blanking period, the horizontal blanking period, and the added transparent area of the video signal, and the transparency information is added to either one of remaining ones.

* * * * *

UNITED STATES PATENT AND TRADEMARK OFFICE
CERTIFICATE OF CORRECTION

PATENT NO. : 10,033,957 B2  
APPLICATION NO. : 15/318456  
DATED : July 24, 2018  
INVENTOR(S) : Takenobu Nishiguchi Page 1 of 1

It is certified that error appears in the above-identified patent and that said Letters Patent is hereby corrected as shown below:

On the Title Page

Foreign Application Priority Data:  
Apr. 7, 2014 (JP) for 2014-139022

Should be corrected to:  
July 4, 2014 (JP) for 2014-139022

Signed and Sealed this  
Twenty-second Day of January, 2019

Andrei Iancu  
*Director of the United States Patent and Trademark Office*